US011595650B2

(12) United States Patent
Luo et al.

(10) Patent No.: US 11,595,650 B2
(45) Date of Patent: Feb. 28, 2023

(54) OPTIMIZATION OF MULTI-SINK WI-FI DISPLAY WITH INTELLIGENT MULTI-SESSION ENCODING

(71) Applicant: Intel Corporation, Santa Clara, CA (US)

(72) Inventors: Ning Luo, Shanghai (CN); Changliang Wang, Bellevue, WA (US); Ujwal Paidipathi, Beaverton, OR (US); Karthik Veeramani, Hillsboro, OR (US); Rajneesh Chowdhury, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/490,149

(22) PCT Filed: Mar. 31, 2017

(86) PCT No.: PCT/CN2017/079010
§ 371 (c)(1),
(2) Date: Aug. 30, 2019

(87) PCT Pub. No.: WO2018/176392
PCT Pub. Date: Oct. 4, 2018

(65) Prior Publication Data
US 2021/0344918 A1  Nov. 4, 2021

(51) Int. Cl.
*H04N 19/12*  (2014.01)
*H04N 19/105*  (2014.01)
(Continued)

(52) U.S. Cl.
CPC .......... *H04N 19/12* (2014.11); *H04N 19/105* (2014.11); *H04N 19/139* (2014.11); *H04N 19/187* (2014.11)

(58) Field of Classification Search
CPC .... H04N 19/12; H04N 19/187; H04N 19/105; H04N 19/139
(Continued)

(56) References Cited

U.S. PATENT DOCUMENTS

2008/0144723 A1  6/2008  Chen et al.
2011/0032425 A1  2/2011  Kamohara
(Continued)

FOREIGN PATENT DOCUMENTS

CN  101208873 A  6/2008
CN  101998096 A  3/2011
(Continued)

OTHER PUBLICATIONS

International Search Report and Written Opinion for International Patent Application No. PCT/CN2017/079010, dated Jan. 5, 2018, 14 pages.

*Primary Examiner* — On S Mung
(74) *Attorney, Agent, or Firm* — Jordan IP Law, LLC

(57) ABSTRACT

Systems, apparatuses, and methods may provide for multi-session encoding to optimize multiple encoding sessions on Wi-Fi display (WFD) source devices when the WFD source devices are connected to multiple sink devices. The multiple encoding sessions may be optimized with encoding hints that are generated by a compositor and transmitted to a pre-encoding checking device. The encoding session that has the highest encoding resolution is subjected to hierarchical motion estimation (HME) processing, and the encoding sessions that have lower resolutions are optimized based on a motion vector prediction hint generated by the encoding session that has the highest encoding resolution and a scaling factor.

25 Claims, 7 Drawing Sheets

(51) Int. Cl.
*H04N 19/139* (2014.01)
*H04N 19/187* (2014.01)

(58) Field of Classification Search
USPC .................................................. 375/240.16
See application file for complete search history.

(56) References Cited

U.S. PATENT DOCUMENTS

| | | |
|---|---|---|
| 2013/0074117 A1 | 3/2013 | Song et al. |
| 2014/0074911 A1 | 3/2014 | Park et al. |
| 2014/0241420 A1* | 8/2014 | Orton-Jay ............ H04N 19/176 375/240.03 |
| 2016/0173935 A1 | 6/2016 | Naik Raikar et al. |
| 2017/0134731 A1* | 5/2017 | Tourapis ................ H04N 19/51 |

FOREIGN PATENT DOCUMENTS

| | | |
|---|---|---|
| CN | 102547031 A | 7/2012 |
| CN | 103024508 A | 4/2013 |

\* cited by examiner

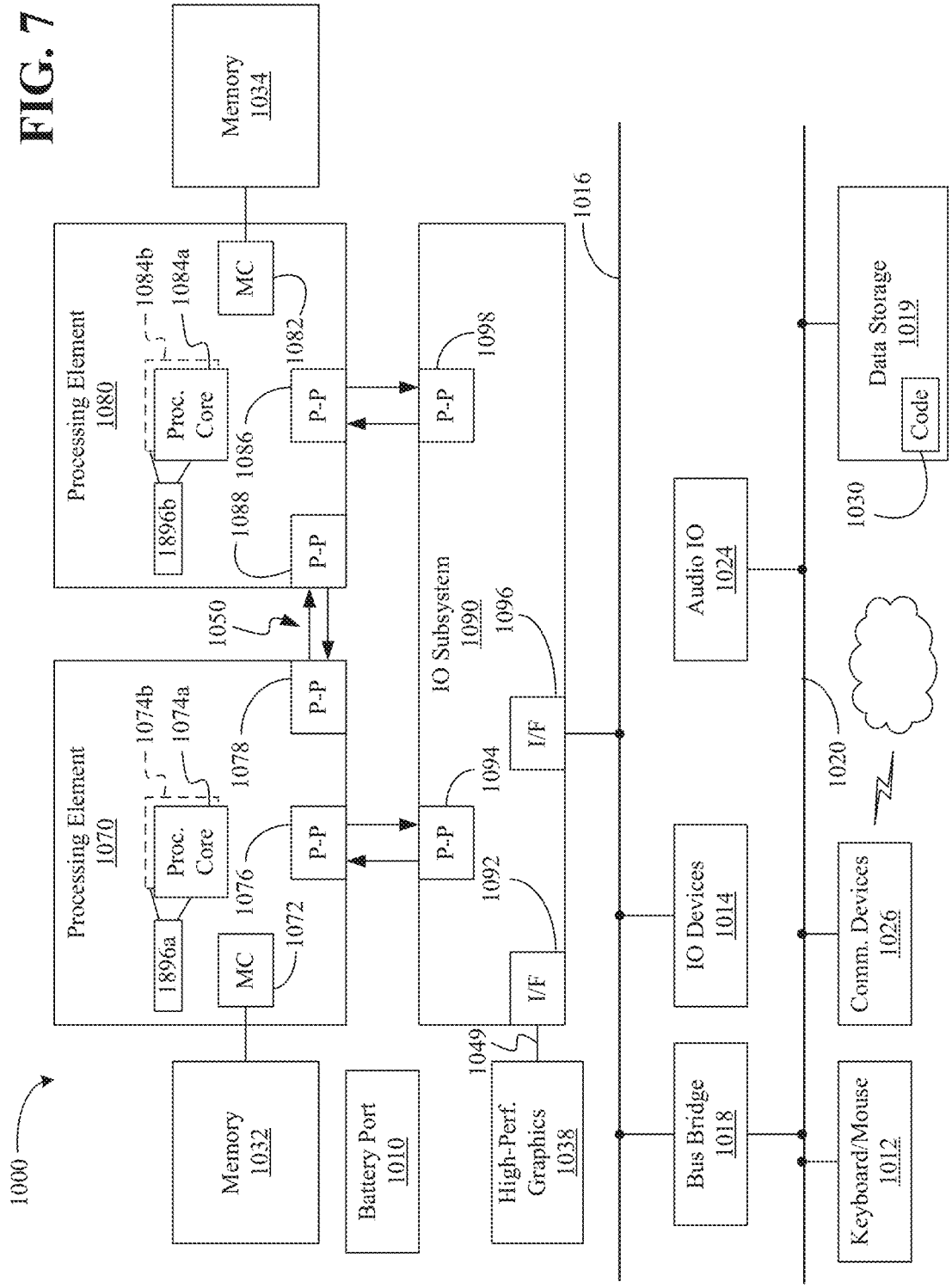

OPTIMIZATION OF MULTI-SINK WI-FI DISPLAY WITH INTELLIGENT MULTI-SESSION ENCODING

CROSS REFERENCE TO RELATED APPLICATIONS

The present application is a U.S. National Phase Patent Application, which claims the benefit of priority to International Patent Application No. PCT/CN2017/079010 filed on Mar. 31, 2017.

BACKGROUND

Technical Field

Embodiments generally relate to an intelligent multi-session encoding process. More particularly, the embodiments relate to a system that optimizes the multiple encoding session on a Wi-Fi display (WFD) source device based on hints from a compositor when the WFD source device is connected to multiple sink (multi-sink) devices.

Discussion

In WFD multi-sink topology, a single WFD Release 2 (WFD R2) source device may establish multiple concurrent WFD sessions with "N" WFD R2 sink devices. For each WFD session that includes an audio/video (A/V) payload, a dedicated encoding session may be required. Concurrent encoding sessions that are performed at the source device may take the same A/V content that is transmitted from a local compositor, and each individual session may differ from the other sessions by encoding configurations such as resolution and bitrate. Therefore, power consumption and latency may be increased.

BRIEF DESCRIPTION OF THE DRAWINGS

The various advantages of the embodiments of the present invention will become apparent to one skilled in the art by reading the following specification and appended claims, and by referencing the following drawings, in which:

FIG. 7 is a block diagram of an example of a computing system according to an embodiment.

DETAILED DESCRIPTION OF EXEMPLARY EMBODIMENTS

Figure 1:
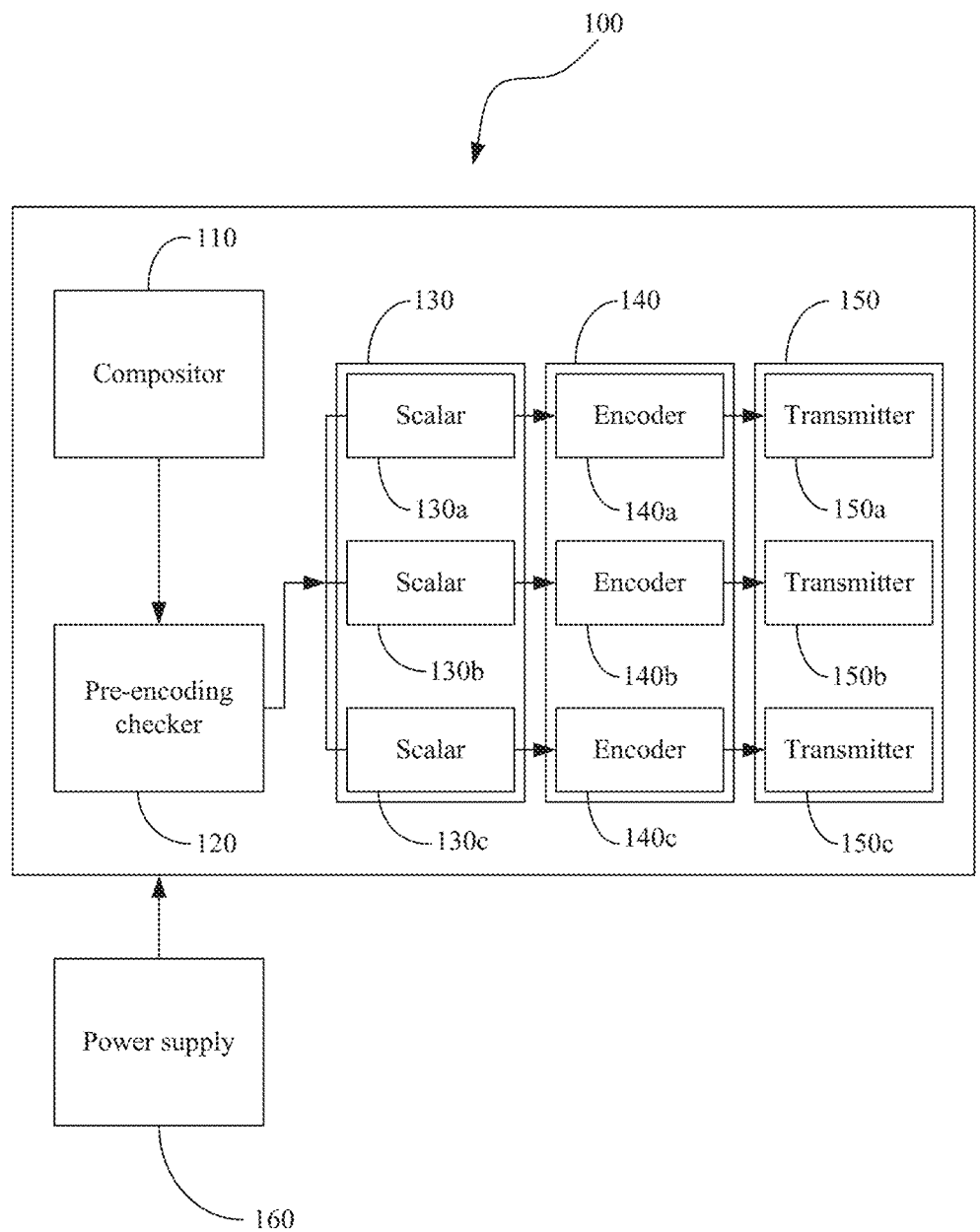
FIG. 1 is a block diagram of an example of a multi-sink multi-session encoding system according to an embodiment.

Turning now to FIG. 1, a multi-sink multi-session encoding system 100 according to an exemplary embodiment is illustrated. The multi-session encoding system 100 may include a compositor 110, a pre-encoding checker 120, one or more data scaling devices 130 (130a, 130b, 130c), one or more encoders 140 (140a, 140b, 140c), one or more transmitters 150 (150a, 150b, 150c), and a power supply 160 to supply power to the multi-sink multi-session encoding system 100.

In the multi-sink topology as illustrated in FIG. 1, the compositor 110, which may be a Wi-Fi display (WFD) source device, may establish multiple concurrent WFD sessions with "N" WFD sink devices (not shown). The compositor or source device 110 may be a WFD Release 2 (R2) source device, but is not limited thereto. Similarly, the sink devices (not shown) may be WFD R2 sink devices.

A/V data may be generated by the compositor 110 and transmitted to the pre-encoding checker 120, where predetermined pre-encoding processes take place. Multiple concurrent data streams may subsequently be transmitted to the one or more data scalers 130 (130a, 130b, 130c), where the A/V data may be digitized and spatially scaled to predetermined resolutions. The concurrent data streams may subsequently be transmitted to one or more encoding devices or encoding sessions 140 (140a, 140b, 140c), where various encoding operations may be performed. The encoded concurrent data streams may then be transmitted to one or more multi-sink devices (not shown) via one or more transmitting devices 150 (150a, 150b, 150c).

Figure 2:
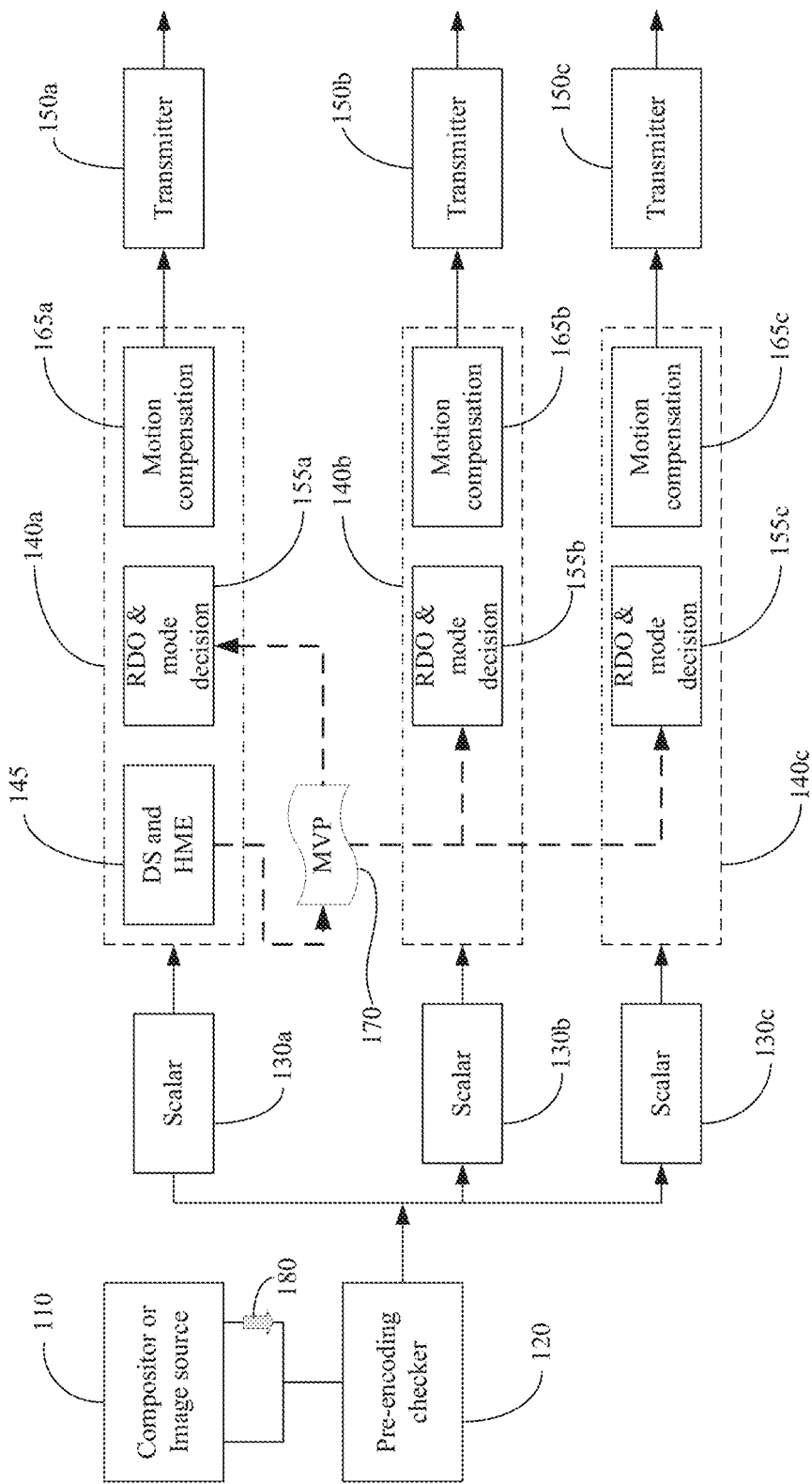
FIG. 2 is an illustration of another example of a multi-sink multi-session encoding system according to an embodiment.

Turning now to FIG. 2, the compositor 110 may generate an audio/video (A/V) stream that may be transmitted to the pre-encoding checker 120. The compositor 110 may also generate useful hints 180, and transmit the useful hints 180 to the pre-encoding checker 120. The useful hints 180 may be used to optimize the encoding processes performed by the encoders 140 (140a, 140b, 140c). The hints 180 may include, but are not limited to, still scene hints or flags, layer geometry hints, dirty rectangle hints, and transform matrix hints. Accordingly, multiple encoding sessions 140 (140a, 140b, 140c) that share the same data source or compositor 110 may be optimized on the basis of the hints 180 received from the compositor 110.

The still scene hints may trigger the encoders 140 (140a, 140b, 140c) to insert skip frames directly into the A/V stream. Accordingly, subsequent encoding stages may be skipped during the encoding process.

The layer geometry hints may add or remove layers from a layer list, and may also include layer rotation, layer scaling, etc. The layer geometry hints may be used to detect changes, and I frames may be intelligently inserted into the A/V stream to create an adaptive group of pictures (GOP).

The dirty rectangle hints may be used to indicate the areas of an image that have to be redrawn or repainted. Rectangular areas of the image may be evaluated to determine which areas of the image have to be redrawn, repainted, or updated. Whenever a change is made to a particular rectangular area of the image, this area may be marked as being dirty, and its rectangular area may be added to a list of dirty rectangles. The dirty rectangle hints may be converted to dirty regions of interest (ROI) to optimize the encoding operations, for example, to only encode the dirty rectangle areas or apply different quantization parameters to each macro-block in the dirty areas.

Transform matrix hints, for example, sub window or layer movement, may be used to derive the motion vector for the corresponding layer to optimize encoding motion estimation.

After the pre-encoding check has been performed by the pre-encoding checker 120, A/V data streams may be concurrently transmitted to one or more data scalers 130 (130a, 130b, 130c). The scalers 130 (130a, 130b, 130c) may digitize and spatially scale the A/V data streams to specific encoding resolutions. The encoding session 140 (140a, 140b, 140c) that receives an A/V data stream that has the highest resolution may be subjected to downscaling (DS) and Hierarchical Motion Estimation (HME) processing by a DS/HME processor 145. The DS/HME processor 145 may generate motion vector predictor (MVP) hints to trigger a heuristic process in a rate distortion optimization (RDO) and mode decision processor 155a.

As illustrated in FIG. 2, only the encoding session that has the highest resolution may be subjected to DS/HME processing. Accordingly, duplicated multi-level DS/HME processing in multiple encoding sessions may be avoided in encoding sessions that have lower resolutions, and in some cases, the entire encoding process may be skipped. The compositor 110 may achieve similar encoding quality as in a case where each encoding session of the one or more encoding sessions includes a DS/HME processor. This may result in lower latency and reduced power consumption by the multi-sink multi-session encoding system.

Returning to FIG. 2, multi-level HME operations may only be performed once by the DS/HME 145 in the encoding session, for example, encoding session 140a, that is processing a data stream that has the highest resolution among the multiple data streams. The hints 180 that are received during the pre-encoding process may be used to optimize the motion estimation processes of each of the encoding sessions 140 (140a, 140b, 140c).

The encoding sessions, for example, encoding sessions 140b and 140c, that have encoding resolutions that differ from the encoding resolution of encoding session 140a, may leverage motion vector prediction hints 170 derived from the encoding session 140a having the highest encoding resolution among the multiple encoding sessions 140, and a scaling factor to obtain the motion vector prediction hint for the subsequent encoding stages (a scaled motion vector). The scaling factor may be determined based on the quotient of the resolution of the corresponding encoding session and the resolution of the encoding session with the highest resolution. The downscaled motion vector prediction hints may be rounded down to the nearest whole number. Additionally, if the ROI derived from the dirty rectangle hint is provided, the ROI may also be scaled with the same scaling factor.

Returning to FIG. 2, for encoding sessions, for example, encoding sessions 140b, 140c that require a bitrate that is different from the bitrate of encoding session 140a, the RDO and mode decision processor 155b, 155c may adjust the bitrate for the corresponding encoding session.

Figure 3:
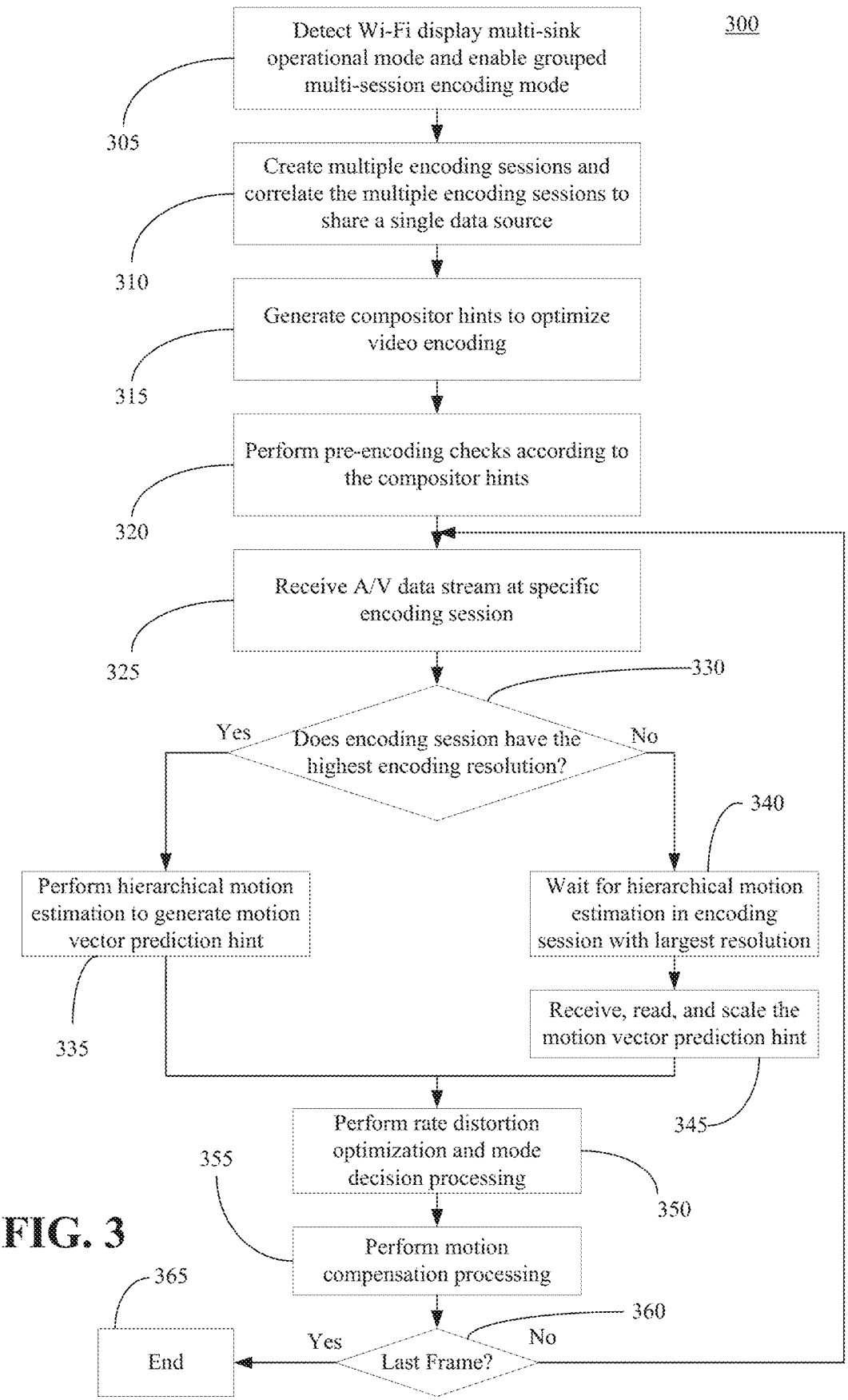
FIG. 3 is an illustration of an example of a method of performing multi-session encoding in a multi-sink Wi-Fi display apparatus according to an embodiment.

Turning now to FIG. 3, a multi-sink multi-session encoding method 300 is illustrated. The method 300 may generally be implemented in a device such as, for example, a smart phone, tablet computer, notebook computer, tablet computer, convertible tablet, PDA, MID, wearable computer, desktop computer, camcorder, video recorder, media player, smart TV, gaming console, etc. More particularly, the method 300 may be implemented as a set of logic instructions stored in a machine or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in method 300 may be written in any combination of one or more programming languages, including an object oriented programming language such as JAVA, SMALLTALK, C++ or the like and conventional procedural programming languages, such as the "C" programming language or similar programming languages.

The illustrated method begins at processing block 305, where a determination is made whether the WFD device is configured in a multi-sink mode. Specifically, a determination is made whether a source device, for example compositor 110 (FIG. 1), is configured to transmit A/V data to multiple sink devices (not shown). If a determination is made that the WFD device is configured in a multi-sink mode, in processing block 310 multiple encoding sessions may be created, and a correlation between the multiple encoding sessions and the single source device or compositor 110 (FIG. 1) may be established.

In processing block 315, the compositor 110 (FIG. 1) may generate useful hints 180 (FIG. 1) that may be used to optimize encoding processes to be performed on the A/V data by encoding sessions 140 (140a, 140b, 140c) (FIG. 1). The hints may include, but are not limited to, still scene hints or flags, layer geometry hints, dirty rectangle hints, and transform matrix hints.

In processing block 320, a pre-encoding check may be performed on the A/V data stream according to the hints generated by the compositor 110 (FIG. 1), and in processing block 325, a determination is made whether new A/V data has been received at the encoding sessions 140 (140a, 140b, 140c) (FIG. 1). If it is determined that new A/V data has been received, a determination is made at processing block 330 with regard to whether the specific encoding session has the highest encoding resolution among the one or more encoding sessions 140 (140a, 140b, 140c) (FIG. 1). If the specific encoding session is the encoding session that has the highest encoding resolution among the one or more encoding sessions, then at processing block 335 HME processing is performed on the A/V data that is being processed by that specific encoding session. Specifically, hierarchical searches may be performed on the current frame to determine motion vectors to encode moving images.

On the other hand, if the specific encoding session is not the encoding session that has the highest encoding resolution among the one or more encoding sessions 140 (140a, 140b, 140c) (FIG. 1), at illustrated processing block 340, the lower resolution encoding sessions await the hierarchical motion estimation of the encoding session that has the highest encoding resolution, and subsequently receive and leverage, at processing block 345, the motion vector prediction hint of the encoding session with the highest resolution and a scaling factor to obtain a motion vector predictor hint for the encoding stages of the lower resolution encoding sessions.

At processing block 350, the encoding sessions that require different bitrates from the encoding session that has the highest encoding resolution may be subjected to RDO processing, mode decision processing, and rate control. At processing block 355, motion compensation processing may be performed on the A/V stream by motion compensation processors (165a, 165b, 165c) (FIG. 2).

At processing block 360, if the last frame of the A/V stream has been processed, the illustrated method ends at processing block 365. Alternately, if at processing block 360 a determination is made that the last frame of the A/V stream has not been processed, the illustrated method returns to processing block 325.

Figure 4:
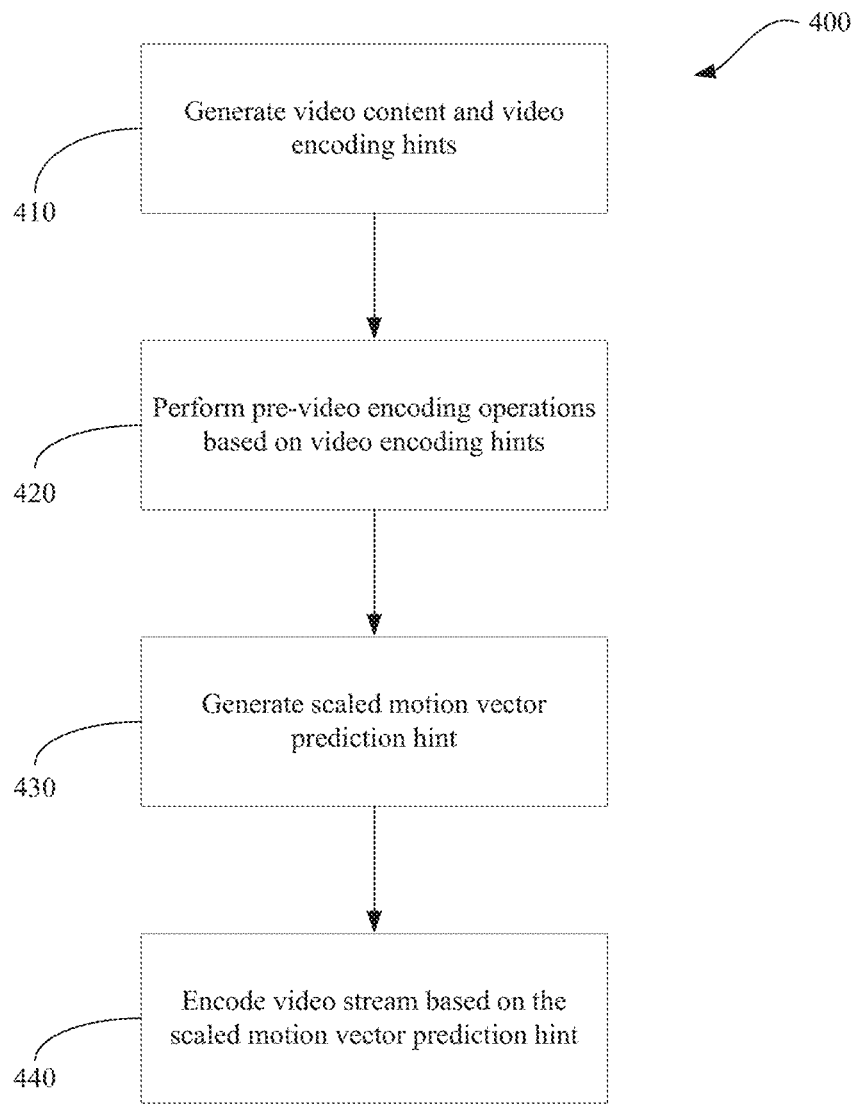
FIG. 4 is an illustration of an example of another method of performing a multi-session encoding operation in a multi-sink Wi-Fi display apparatus according to an embodiment.

Turning now to FIG. 4, another method 400 of performing multi-session encoding in a multi-sink Wi-Fi display apparatus is shown. The method 400 may generally be implemented in a device such as, for example, a smart phone, tablet computer, notebook computer, tablet computer, convertible tablet, PDA, MID, wearable computer, desktop computer, camcorder, video recorder, media player, smart TV, gaming console, etc., already discussed. More particularly, the method 400 may be implemented as a set of logic instructions stored in a machine- or computer-readable medium of a memory such RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof. For example, computer program code to carry out operations shown in method 400 may be written in any combination of one or more programming languages, including an object oriented programming language such as JAVA, SMALLTALK, C++ or the like and conventional procedural programming languages, such as the "C" programming language or similar programming languages.

The illustrated method begins at processing block 410, where A/V content and one or more video encoding hints may be generated by a compositor (FIG. 2). The hints may be used to optimize multiple encoding sessions. Pre-video encoding operations may be performed on the A/V data based on the generated video encoding hints at processing block 420.

At processing block 430, a scaled motion vector prediction hint may be generated by a hierarchical motion estimation processor 145 (FIG. 2) in an encoding session that has the highest encoding resolution. The A/V streams in encoding sessions that have lower encoding resolutions may be encoded based on the scaled motion vector prediction hint in processing block 440.

Figure 5:
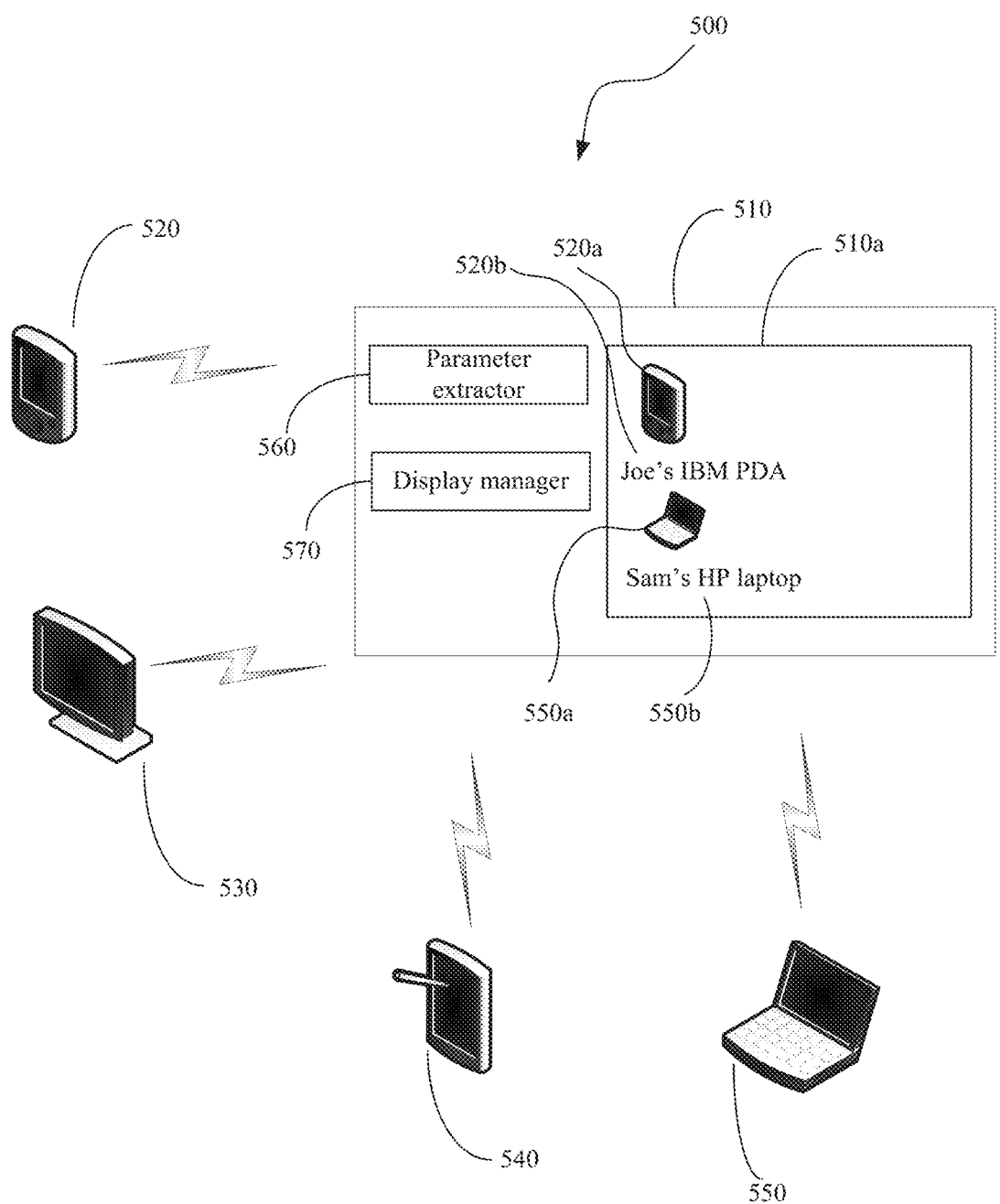
FIG. 5 is an illustration of a many to one wireless display system according to an embodiment.

Turning now to FIG. 5, another exemplary embodiment of the application is illustrated. The exemplary embodiment illustrates a many to one communication system 500 wherein a plurality of transmitter devices 520, 530, 540, 550 may be connected to a single receiver 510. The receiver 510 may include a screen or display device 510a, where various images may be displayed, a parameter extractor 560, and a display manager 570. The receiver may be a Miracast™ receiver, but is not limited thereto.

According to the exemplary embodiment, the receiver 510 may represent each transmitter device 520, 530, 540, 550 on the display device 510a in a minimized manner via a device classification thumbnail image (520a, 550a) and an associated information bar (520b, 550b) that includes device information that uniquely identifies each transmitter device 520, 530, 540, 550 to the end user of the receiver 510.

The transmitter devices 520, 530, 540, 550 may connect to the receiver 510 by utilizing a Wi-Fi direct connectivity standard. Once the connection between the transmitter devices 520, 530, 540, 550 and the receiver 510 has been established, or during a capability negotiation phase of the connection phase, each of the transmission devices 520, 530, 540, 550 may send transmitter device parameters or additional information of itself, for example, a friendly name, device model number, color, or a Uniform Resource Identifier (URI), to the receiver 510 via a Real Time Streaming Protocol (RTSP) SET PARAMETER message with the following tag:
    wfd-device-info="wfd_device_info:" SP model_number SP
    friendly_name SP color SP URI model_number=Device model number from manufacturer
    friendly_name=device or hostname set by device user
    color=color of the device, either obtained from the device or through user input
    URI=user identifier, e.g., user account identifier/email, user workspace account name When the receiver 510 receives the SET PARAMETER message, the parameter extractor 560 of the receiver 510 may extract the model number, color, the friendly name, and URI of the transmission devices 520, 530, 540, 550, and associate these extracted parameters with the session corresponding to each transmission device 520, 530, 540, 550. The display manager 570 may derive a transmitter identifier based on the extracted transmitter device parameters.

Additionally, the receiver 510 may determine the type of transmission device 520, 530, 540, 550 on the basis of the model number, either by using a list of models available to the receiver 510, or by utilizing external sources such as Internet/Cloud network services. By combining the friendly name with the model number of the transmission device 520, 530, 540, 550, the receiver 510 may create a unique, readable name, or a transmitter identifier, for each transmission device 520, 530, 540, 550, for example, "Joe's IBM PDA", where "Joe" is the friendly name in the RTSP SET PARAMETER message, and "IBM PDA" is derived from the model number.

The receiver 510 may also associate a bitmap (either from its own database or downloaded from the Internet or the Cloud network) for each device type once the receiver 510 has determined the device type from the model number.

Additionally, each transmission device 520, 530, 540, 550 may also transmit a static image, for example a home screen of the transmission device 520, 530, 540, 550, or a user configured image as an auxiliary stream in the MPEG-TS stream from the transmission device 520, 530, 540, 550 to the receiver 510. The receiver 510 may use this static image as a thumbnail image 520a, 550a, to represent the transmission device 520, 530, 540, 550 when the transmission device 520, 530, 540, 550 is minimized on the display device 510a of the receiver 510. Alternately, the receiver 510 may use the last image or video frame that was transmitted from each transmission device 520, 530, 540, 550 before the transmission device 520, 530, 540, 550 is minimized on the display device 510a of the receiver 510.

The receiver 510 may depict each minimized transmission device 520, 530, 540, 550 as a thumbnail image 520a, 550a with an information bar 520b, 550b. The thumbnail image 520a, 550a may consist of a bitmap depicting the device type and overlaid with the static image transmitted by the transmission device 520, 530, 540, 550 in the MPEG-TS stream. The information bar 520b, 550b may contain the device information, for example, the friendly name, model number, device type, or URI. The receiver 510 may also display the thumbnail image 520a, 550a in an outlined form factor of the transmission device 520, 530, 540, 550 based on the received model number. Alternately, the outline image of the transmission device 520, 530, 540, 550 may be obtained from an external outline repository that the receiver 510 has access to.

Additionally, the color of the border of the thumbnail image 520a, 550a may be the color of the transmission device 520, 530, 540, 550. This allows the easy distinction of devices that have the same model number but different colors.

Figure 6:
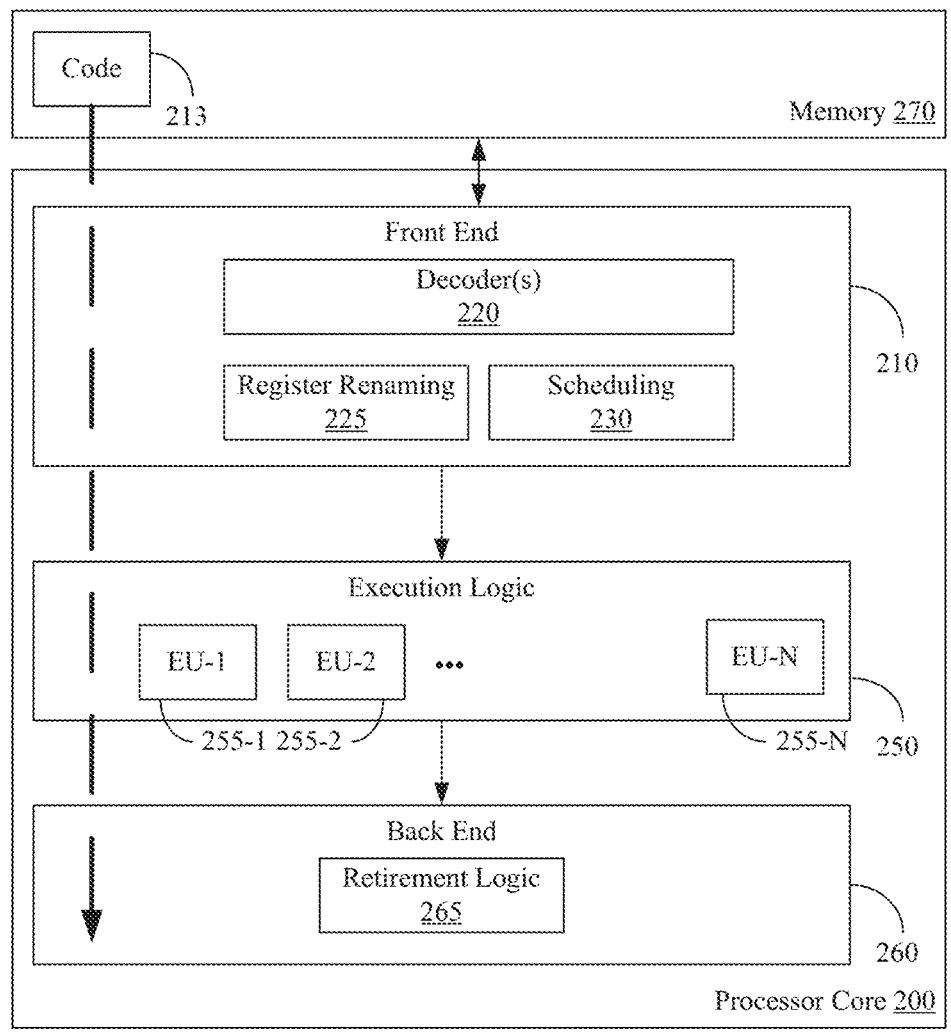
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 300 (FIG. 3), or the method 400 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals that reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., speakers, cameras, sensors) may be coupled to the first bus 1016, along with a bus bridge 1018, which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device that may include code 1030, in one embodiment. The illustrated code 1030 may implement the method 300 (FIG. 3), or the method 400 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

ADDITIONAL NOTES AND EXAMPLES

Example 1 may include a multi-sink multi-session encoding system comprising a power supply to provide power to the system, and a Wi-Fi display (WFD) source device including a compositor to generate one or more video streams and one or more video encoding hints, a pre-encoding checker to perform pre-video encoding operations based on the one or more video encoding hints, a scaler to generate a scaled motion vector predictor hint, one or more encoders to encode the one or more video streams in one or more encoding sessions, and one or more transmitters to transmit the one or more encoded video streams.

Example 2 may include the system of example 1, wherein the video encoding hints are to include one or more of a still scene hint, a layer geometry hint, a dirty rectangle, or a transform matrix hint.

Example 3 may include the system of any one of examples 1 and 2, wherein hierarchical motion estimation (HME) operations are to be performed on a first encoding session of the one or more encoding sessions that has a first resolution.

Example 4 may include the system of example 3, wherein one or more second encoding sessions that have a resolution lower than the first resolution use a video encoding hint of the first encoding session and a scaling factor to obtain the scaled motion vector prediction hint.

Example 5 may include the system of example 4, wherein the scaled motion vector prediction hint is to be applied to encoding stages for the one or more second encoding sessions.

Example 6 may include the system of example 4, wherein the scaling factor is equal to a ratio of a resolution of each of the one or more second corresponding encoding sessions to the resolution of the first encoding session.

Example 7 may include a method of conducting multi-sink multi-session encoding comprising generating, by a compositor, video content and one or more video encoding hints, performing one or more pre-video encoding operations on the video content based on the one or more video encoding hints, generating a scaled motion vector predictor hint, and encoding one or more video streams in one or more encoding sessions based on the scaled motion vector predictor hint.

Example 8 may include the method of example 7, wherein the video encoding hints include one or more of a still scene hint, a layer geometry hint, a dirty rectangle, or a transform matrix hint.

Example 9 may include the method of any one of examples 7 and 8, further comprising performing one or more hierarchical motion estimation (HME) operations during a first encoding session of the one or more encoding sessions that has a first resolution.

Example 10 may include the method of example 9, wherein one or more second encoding sessions that have a resolution lower than the first resolution use a video encoding hint of the first encoding session and a scaling factor to obtain the scaled motion vector prediction hint.

Example 11 may include the method example 10, wherein the scaled motion vector prediction hint is applied to one or more encoding stages associated with the one or more second encoding sessions.

Example 12 may include the method of example 10, wherein the scaling factor is equal to a ratio of a resolution of each of the one or more second encoding sessions to the resolution of the first encoding session.

Example 13 may include a multi-sink multi-session encoding apparatus comprising a compositor to generate one or more video streams and one or more video encoding hints, a pre-encoding checker to perform pre-video encoding operations based on the one or more video encoding hints, a scaler to generate a scaled motion vector predictor hint, and one or more encoders to encode the one or more video streams in one or more encoding sessions.

Example 14 may include the apparatus of example 13, wherein the video encoding hints are to include one or more of a still scene hint, a layer geometry hint, a dirty rectangle, or a transform matrix hint.

Example 15 may include the apparatus of any one of examples 13 and 14, wherein hierarchical motion estimation (HME) operations are to be performed on a first encoding session of the one or more encoding sessions that has a first resolution.

Example 16 may include the apparatus of example 15, wherein one or more second encoding sessions that have a resolution lower than the first resolution use a video encoding hint of the first encoding session and a scaling factor to obtain the scaled motion vector prediction hint.

Example 17 may include the apparatus of example 16, wherein the scaled motion vector prediction hint is to be applied to encoding stages for the one or more second encoding sessions.

Example 18 may include the apparatus of example 16, wherein the scaling factor is equal to a ratio of a resolution of each of the one or more second corresponding encoding sessions to the resolution of the first encoding session.

Example 19 may include at least one computer readable storage medium comprising a set of instructions, which when executed by an apparatus, cause the apparatus to generate video content and one or more video encoding hints, perform one or more pre-video encoding operations on the video content based on the one or more video encoding hints, generate a scaled motion vector predictor hint, and encode one or more video streams in one or more encoding sessions based on the scaled motion vector predictor hint.

Example 20 may include the at least one computer readable storage medium of example 19, wherein the video encoding hints include one or more of a still scene hint, a layer geometry hint, a dirty rectangle, or a transform matrix hint.

Example 21 may include the at least one computer readable storage medium of any one of examples 19 and 20, further comprising performing one or more hierarchical motion estimation (HME) operations during a first encoding session of the one or more encoding sessions that has a first resolution.

Example 22 may include the at least one computer readable storage medium of example 21, wherein one or more second encoding sessions that have a resolution lower than the first resolution use a video encoding hint of the first encoding session and a scaling factor to obtain the scaled motion vector prediction hint.

Example 23 may include the at least one computer readable storage medium of example 22, wherein the scaled motion vector prediction hint is applied to one or more encoding stages associated with the one or more second encoding sessions.

Example 24 may include the at least one computer readable storage medium of example 22, wherein the scaling factor is equal to a ratio of a resolution of each of the one or more second encoding sessions to the resolution of the first encoding session.

Example 25 may include a multi-sink multi-session encoding apparatus comprising means for generating, by a compositor, video content and one or more video encoding hints, means for performing one or more pre-video encoding operations on the video content based on the one or more video encoding hints, means for generating a scaled motion vector predictor hint, and means for encoding one or more video streams in one or more encoding sessions based on the scaled motion vector predictor hint.

Example 26 may include the apparatus of example 25, wherein the video encoding hints include one or more of a still scene hint, a layer geometry hint, a dirty rectangle, or a transform matrix hint.

Example 27 may include the apparatus of any one of examples 25 and 26, further comprising means for performing one or more hierarchical motion estimation (HME) operations during a first encoding session of the one or more encoding sessions that has a first resolution.

Example 28 may include the apparatus of example 27, wherein one or more second encoding sessions that have a resolution lower than the first resolution is to use a video encoding hint of the first encoding session and a scaling factor to obtain the scaled motion vector prediction hint.

Example 29 may include the apparatus example 28, wherein the scaled motion vector prediction hint is applied to one or more encoding stages associated with the one or more second encoding sessions.

Example 30 may include the apparatus of example 28, wherein the scaling factor is equal to a ratio of a resolution of each of the one or more second encoding sessions to the resolution of the first encoding session.

Example 31 may include a many-to-one wireless display system comprising one or more transmitter devices, a receiver device to receive a Moving Picture Experts Group (MPEG) transport stream (TS) from the one or more transmitter devices, the receiver device comprising a parameter extractor to extract transmitter device parameters from the MPEG-TS, a display manager to derive a transmitter identifier based on the extracted transmitter device parameters, and a display device to display a thumbnail image of the one or more transmitter devices and an associated information bar that includes the transmitter identifier.

Example 32 may include the system of example 31, wherein the transmitter device parameters include one or more of a friendly name, a transmitter device model number, a transmitter device type, a uniform resource identifier (URI), or a transmitter device color.

Example 33 may include the system of example 31, wherein the thumbnail image is a bitmap depicting a transmitter device type.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
   a power supply to provide power to the system; and
   a Wi-Fi display (WFD) source device including:
   a compositor to generate one or more video streams and one or more video encoding hints, wherein the video encoding hints are to include one or more of a layer geometry hint or a dirty rectangle hint;
   a pre-encoding checker to perform pre-video encoding operations corresponding to the one or more video encoding hints;
   one or more encoders to encode the one or more video streams in one or more encoding sessions, wherein the layer geometry hint triggers the one or more encoders to insert I-frames into the one or more encoded video streams to create an adaptive group of pictures, and wherein the dirty rectangle hint triggers the one or more encoders to only encode dirty areas of an image or apply different quantization parameters to dirty areas, and
   one or more transmitters to transmit the one or more encoded video streams.

2. The system of claim 1, wherein the video encoding hints are to include one or more of a still scene hint or a transform matrix hint,
   wherein the still scene hint triggers the one or more encoders to insert skip frames into the one or more encoded video streams, and
   wherein the transform matrix hint includes sub-window movement data or layer movement data that triggers the one or more encoders to derive a sub-window motion vector or a layer movement motion vector.

3. The system of claim 1, further comprising a scaler to generate a scaled motion vector predictor hint, and wherein hierarchical motion estimation (HME) operations are to be performed on a first encoding session of the one or more encoding sessions that has a first resolution.

4. The system of claim 3, wherein one or more second encoding sessions that have a resolution lower than the first resolution use a video encoding hint including a motion vector prediction hint of the first encoding session and a scaling factor to obtain the scaled motion vector prediction hint.

5. The system of claim 4, wherein the scaled motion vector prediction hint is to be applied to encoding stages for the one or more second encoding sessions.

6. The system of claim 4, wherein the dirty rectangle hint is converted to a dirty region of interest to encode the one or more video streams, and wherein the dirty region of interest is scaled corresponding to the scaling factor, and wherein the scaling factor is equal to a ratio of a resolution of each of the one or more second corresponding encoding sessions to the resolution of the first encoding session.

7. A method comprising:
   generating, by a compositor, video content and one or more video encoding hints;
   performing one or more pre-video encoding operations on the video content corresponding to the one or more video encoding hints, wherein the video encoding hints include one or more of a layer geometry hint or a dirty rectangle; and
   encoding one or more video streams in one or more encoding sessions, wherein the layer geometry hint triggers the one or more encoders to insert I-frames into the one or more encoded video streams to create an adaptive group of pictures, and wherein the dirty rectangle hint triggers the one or more encoders to only encode dirty areas of an image or apply different quantization parameters to dirty areas.

8. The method of claim 7, wherein the video encoding hints include one or more of a still scene hint or a transform matrix hint,
   wherein the still scene hint triggers the one or more encoders to insert skip frames into the one or more encoded video streams, and
   wherein the transform matrix hint includes sub-window movement data or layer movement data that triggers the one or more encoders to derive a sub-window motion vector or a layer movement motion vector.

9. The method of claim 7, further comprising:
   generating a scaled motion vector predictor hint; and
   performing one or more hierarchical motion estimation (HME) operations during a first encoding session of the one or more encoding sessions that has a first resolution.

10. The method of claim 9, wherein one or more second encoding sessions that have a resolution lower than the first resolution use a video encoding hint including a motion vector prediction hint of the first encoding session and a scaling factor to obtain the scaled motion vector prediction hint.

11. The method of claim 10, wherein the scaled motion vector prediction hint is applied to one or more encoding stages associated with the one or more second encoding sessions.

12. The method of claim 10, wherein the dirty rectangle hint is converted to a dirty region of interest to encode the one or more video streams, and wherein the dirty region of interest is scaled corresponding to the scaling factor, and wherein the scaling factor is equal to a ratio of a resolution of each of the one or more second encoding sessions to the resolution of the first encoding session.

13. An apparatus comprising:
    a compositor to generate one or more video streams and one or more video encoding hints, wherein the video encoding hints include one or more of a layer geometry hint or a dirty rectangle hint;
    a pre-encoding checker to perform pre-video encoding operations corresponding to the one or more video encoding hints; and
    one or more encoders to encode the one or more video streams in one or more encoding sessions, wherein the layer geometry hint triggers the one or more encoders to insert I-frames into the one or more encoded video streams to create an adaptive group of pictures, and wherein the dirty rectangle hint triggers the one or more encoders to only encode dirty areas of an image or apply different quantization parameters to dirty areas.

14. The apparatus of claim 13, wherein the video encoding hints are to include one or more of a still scene hint or a transform matrix hint,
    wherein the still scene hint triggers the one or more encoders to insert skip frames into the one or more encoded video streams, and
    wherein the transform matrix hint includes sub-window movement data or layer movement data that triggers the one or more encoders to derive a sub-window motion vector or a layer movement motion vector.

15. The apparatus of claim 13, further comprising a scaler to generate a scaled motion vector predictor hint, and wherein hierarchical motion estimation (HME) operations are to be performed on a first encoding session of the one or more encoding sessions that has a first resolution.

16. The apparatus of claim 15, wherein one or more second encoding sessions that have a resolution lower than the first resolution use a video encoding hint including a motion vector prediction hint of the first encoding session and a scaling factor to obtain the scaled motion vector prediction hint.

17. The apparatus of claim 16, wherein the scaled motion vector prediction hint is to be applied to encoding stages for the one or more second encoding sessions.

18. The apparatus of claim 16, wherein the dirty rectangle hint is converted to a dirty region of interest to encode the one or more video streams, and wherein the dirty region of interest is scaled corresponding to the scaling factor, and wherein the scaling factor is equal to a ratio of a resolution of each of the one or more second corresponding encoding sessions to the resolution of the first encoding session.

19. At least one non-transitory computer readable storage medium comprising a set of instructions, which when executed by an apparatus, cause the apparatus to:
generate video content and one or more video encoding hints, wherein the video encoding hints include one or more of a layer geometry hint or a dirty rectangle hint;
perform one or more pre-video encoding operations on the video content corresponding to the one or more video encoding hints; and
encode one or more video streams in one or more encoding sessions, wherein the layer geometry hint triggers the one or more encoders to insert I-frames into the one or more encoded video streams to create an adaptive group of pictures, and wherein the dirty rectangle hint triggers the one or more encoders to only encode dirty areas of an image or apply different quantization parameters to dirty areas.

20. The at least one non-transitory computer readable storage medium of claim 19, wherein the video encoding hints include one or more of a still scene hint or a transform matrix hint,
wherein the still scene hint triggers the one or more encoders to insert skip frames into the one or more encoded video streams, and
wherein the transform matrix hint includes sub-window movement data or layer movement data that triggers the one or more encoders to derive a sub-window motion vector or a layer movement motion vector.

21. The at least one non-transitory computer readable storage medium of claim 19, wherein the set of instructions further cause the apparatus to:
generate a scaled motion vector predictor hint, and
perform one or more hierarchical motion estimation (HME) operations during a first encoding session of the one or more encoding sessions that has a first resolution.

22. The at least one non-transitory computer readable storage medium of claim 21, wherein one or more second encoding sessions that have a resolution lower than the first resolution use a video encoding hint including a motion vector prediction hint of the first encoding session and a scaling factor to obtain the scaled motion vector prediction hint, and wherein the scaled motion vector prediction hint is applied to one or more encoding stages associated with the one or more second encoding sessions.

23. A system comprising:
one or more transmitter devices;
a receiver device to receive a Moving Picture Experts Group (MPEG) transport stream (TS) from the one or more transmitter devices;
the receiver device comprising:
a parameter extractor to extract transmitter device parameters from the MPEG-TS, wherein the transmitter device parameters include one or more of a transmitter device model number or a uniform resource identifier (URI);
a display manager to derive a transmitter identifier corresponding to the extracted transmitter device parameters; and
a display device to display a thumbnail image of the one or more transmitter devices and an associated information bar that includes the transmitter identifier.

24. The system of claim 23, wherein the transmitter device parameters include a friendly name, a transmitter device type, a transmitter device color, the transmitter device model number, and the uniform resource identifier (URI), and wherein the transmitter identifier is a unique transmitter identifier for individual transmitter devices.

25. The system of claim 23, wherein the thumbnail image is a bitmap depicting a transmitter device type.

* * * * *